United States Patent [19]
Gregory et al.

[11] Patent Number: 5,491,399
[45] Date of Patent: Feb. 13, 1996

[54] LEAD ACID BATTERY REJUVENATOR

[75] Inventors: William E. Gregory, 700 Kosstre Ct., Irving, Tex. 75061; Chester C. Allen, Jr., Dallas, Tex.

[73] Assignee: William E. Gregory, Irving, Tex.

[21] Appl. No.: 92,515

[22] Filed: Jul. 16, 1993

Related U.S. Application Data

[63] Continuation-in-part of Ser. No. 68,159, May 28, 1993.
[51] Int. Cl.⁶ .................................................... H02J 7/00
[52] U.S. Cl. .................... 320/61; 320/21; 320/2; 323/906
[58] Field of Search ................... 320/2, 21, 61; 323/906; 363/18, 19, 20, 21

[56] References Cited

U.S. PATENT DOCUMENTS

| | | | |
|---|---|---|---|
| 3,586,955 | 6/1971 | Kisiel | 320/39 |
| 4,183,080 | 1/1980 | Liebman | 363/18 |
| 4,214,198 | 7/1980 | Schneider | 320/15 |
| 4,246,634 | 1/1981 | Purol | 363/19 X |
| 4,363,005 | 12/1982 | Kuroda et al. | 363/19 X |
| 4,366,430 | 12/1982 | Wright | 320/25 |
| 4,697,136 | 9/1987 | Ishikawa | 323/906 X |
| 4,750,102 | 6/1988 | Yamano et al. | 323/906 X |
| 4,871,959 | 10/1989 | Gali | 320/61 |
| 4,882,663 | 11/1989 | Nilssen | 363/19 |
| 5,084,664 | 1/1992 | Gali | 320/61 |

*Primary Examiner*—Peter S. Wong
*Assistant Examiner*—Aditya Kashnan
*Attorney, Agent, or Firm*—William J. Scherback

[57] ABSTRACT

A combination rejuvenator and trickle charger for lead acid batteries powered by a multi-solar cell unit and/or a rectified a.c. source, the output of which is applied to a capacitor. The output of the capacitor is in turn connected across the primary of an auto transformer. A switching circuit, including a transistor, connects and disconnects the primary coil to and from the capacitor to produce in the secondary coil of the transformer a fast rise time current pulse for application to a battery. A positive temperature coefficient resistor is connected in series with an output terminal of the rejuvenator to protect the rejuvenator components in the event the out, put terminals, through accident or mistake, are connected to battery terminals of opposite polarity.

9 Claims, 2 Drawing Sheets

60 ma peak current accross 10 ohm resistor
120 μsec period = 8.333 KHz
Charge decays to zero in 84 μsec

LEAD ACID BATTERY REJUVENATOR

RELATED APPLICATIONS

This application is a continuation-in-part of application Ser. No. 08/068,159 filed May 28, 1993.

BACKGROUND OF THE INVENTION

1. Field of Invention

This invention relates, in general, to battery chargers, and more particularly to a lead acid battery combination rejuvenator and trickle charger operational both in sunlight and in darkness.

2. Prior Art

During the use of lead acid batteries, lead sulfate deposits slowly build up on the plates to partially cover sponge lead and lead oxide plate surfaces. After a period of time the sulfate deposits crystalize and offer a high impedance to the flow of ions, thus reducing the efficiency of the battery. Low D.C. current recharging is ineffective to dislodge sulfate deposits. Over the years efforts have been made to dislodge these deposits by a fast charging technique which generally overheats and warps the plates in the battery. While a battery may still appear to have taken a charge and even the electrolyte may check as being correct but the battery does not hold a charge as the plates become effectively shorted. Efforts have been made by utilizing a series of fast rise time voltage pulses to release the sulfates from the battery plate surfaces, the released sulfate either going into solution or spalling off and dropping to the bottom of the battery case. Such technique is described in U.S. Pat. No. 5,084,664 issued to Carl E. Gali and entitled, "Solar Powered Lead Acid Battery Rejuvenator and Trickle Charger."

While the present invention has some of those features recited in the foregoing patent, it is a more efficient, more flexible and a more effective technique for removing the lead sulfate deposits from the battery plates to extend the useful service life and reliability of lead acid batteries.

SUMMARY OF THE INVENTION

The present invention provides for a combination rejuvenator and trickle charger for lead acid batteries comprising in one embodiment, as a source of supply voltage, a multi-solar cell unit. In another embodiment the supply of voltage is provided by a converter which converts a.c. to d.c.. In the one embodiment utilizing solar cells, four (4) cells are connected in series, each producing approximately one-half (½) volt. Power from the four (4) cells therefore is approximately two (2) volts. Output of the bank of solar cells is applied to a capacitor, the output of which is connected across a primary of a transformer. In a preferred embodiment the transformer is an auto-transformer, A switching circuit, including a transistor, connects and disconnects the primary coil to and from said capacitor to produce in a secondary coil of the transformer a fast rise time current pulse for application to a battery. The operation of the transformer in conjunction with the switching circuit is likened to a flyback circuit. The turns ratio of the transformer may range from six (6) to eighteen (18), depending upon operating voltage of the battery to be treated by the rejuvenator and trickle charger; that is whether the battery is a twelve (12) volt, twenty-four (24) volt, or a thirty-six (36) volt battery. The output of the rejuvenator may be applied to battery terminals by way of a plug inserted into a cigarette lighter located in a vehicle or applied by way of an extension cord and clips to be connected directly to terminals of a battery. A positive coefficient resistor is connected in series with one of the terminals to protect the rejuvenator in the event the output terminals through inadvertence, accident or mistake are connected to battery terminals of opposite polarity.

Sulfates build up most rapidly when a battery is at rest, as when an automobile is parked in a garage or a boat is tied up in a covered slip at a marina for an extended period of time. In those situations where the incident light is minimal provision is made to plug the rejuvenator and trickle charger into a source of d.c. which can take the form of a converter plugged into a local source of a.c.. Thus the rejuvenator and trickle charger of the present invention is operational both in sunlight and in darkness.

DETAILED DESCRIPTION

Figure 1:
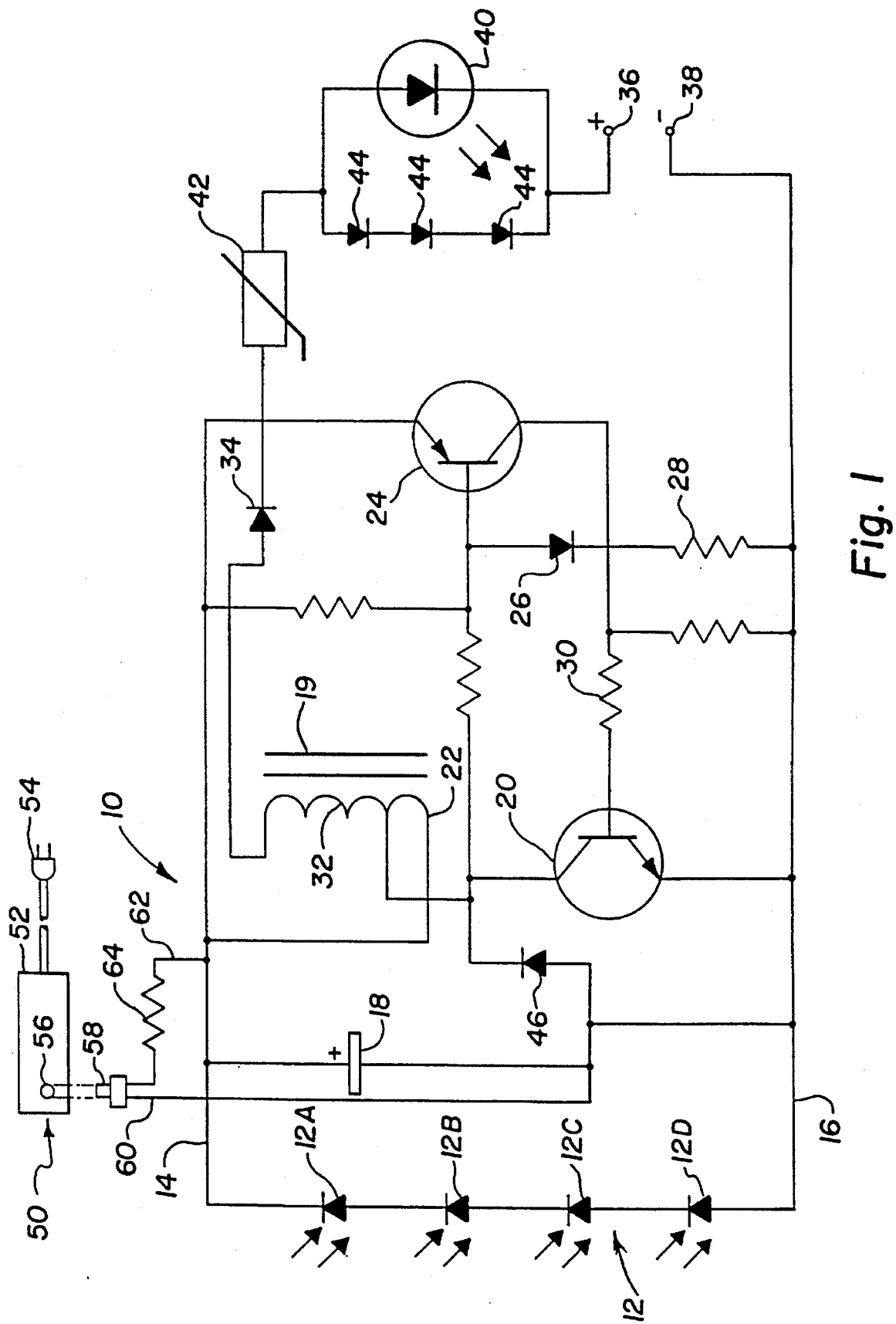
FIG. 1 is a circuit schematic illustrating details of the rejuvenator and trickle charger of the present invention.

Referring now to the drawing, a power source for the battery rejuvenator and trickle charger 10, shown comprised of a solar cell bank 12, including four (4) solar cells, 12A, 12B, 12C, and 12D connected in series. Each cell is capable of producing an output voltage of approximately 0.5 volts and therefore the voltage output of the bank of twelve (12) solar cells will be two (2) volts.

Another power source 50 is shown available to be connected in parallel with the bank of solar cells when the battery is in a darkened environment.

The current output of a solar cell is dependent upon the amount of incident light falling upon the cell. For a given incident light level, a solar cell puts out 250 milliamps. Above 250 milliamps the voltage output drops quickly. Below 250 milliamps the output voltage is fairly constant.

The output of the solar cell bank 12 is applied by way of conductors 14 and 16 to a flyback network comprised of transformer 18 and switching transistor 20. With switching transistor 20 on and conducting current flows from the capacitor through the primary coil 22 of the transformer 18 to magnetize the core of the transformer. Current continues to flow into the capacitor 18 from the solar cell bank until the capacitor voltage reaches the maximum output voltage of the solar cell bank 12. The voltage across the capacitor 18 is sensed by a network including switching transistor 24, switching diode 26, and resistor 28. Switching transistor 24 turns on when the sensed voltage reaches the value $V_{on}$. The value of voltage $V_{on}$ can be expressed as:

$$V_{on} \approx V_{be} + V_f + I_{b2} \times R_{28} \qquad (1)$$

Where:

$V_{be}$ = the base-emitter voltage of triode 24

$V_f$ = forward drop of diode 26

$I_{b2}$ = the base drive current of triode 24

$R_{28}$ = resistance of the resistor $R_{28}$.

Turning on of the switching transistor 24 turns on switching transistor 20 and these transistors remain on while energy is transferred from the capacitor 18 to the primary of transformer 19.

When the voltage of capacitor 18 drops below the value required to sustain a minimum base current drive for the transistor 20, both transistor 20 and transistor 24 turn off. The value of the voltage at which the transistors turn off, $V_{off}$, may be expressed as follows:

$$V_{off} \approx 2 \times V_{sat} + I_{b1} \times R_{30} \qquad (2)$$

Where:

$V_{sat}$ = saturation voltage of transistor 20 or transistor 24

$I_{b1}$ = base current drive for transistor 20 or 30

$R_{30}$ = the resistance of resistor 30

When voltage $V_{off}$ has been attained, switching transistor 20 turns off, the voltage flies back in the secondary 32 of the transformer 19 to a value determined in part by the load, which includes the battery (not Shown) and diode 34, together with the turns ratio of the secondary coil of the transformer with respect to the primary coil.

By appropriate selection of turns ratio the fly back voltage may be utilized to charge either a 12 volt, a 24 volt, or a 36 volt battery.

Figure 2:
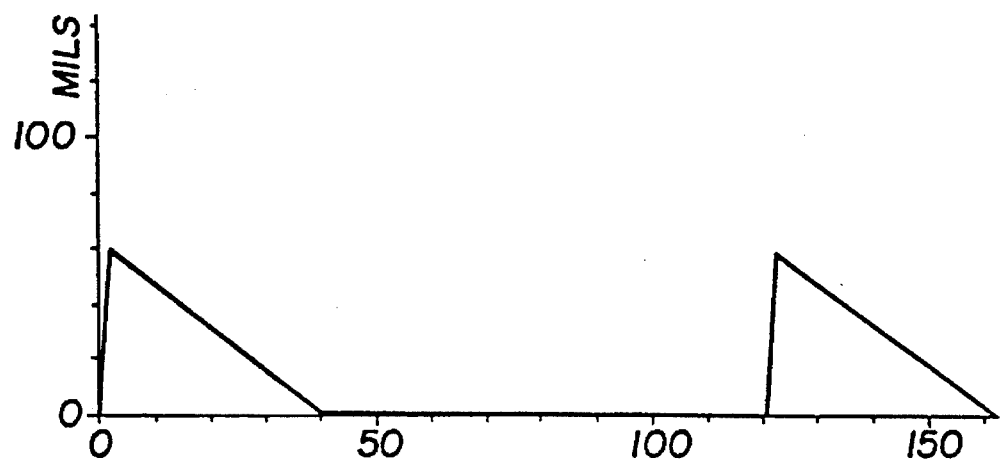
FIG. 2 illustrates the current wave form output of the schematic of FIG. 1.
Figure 3:
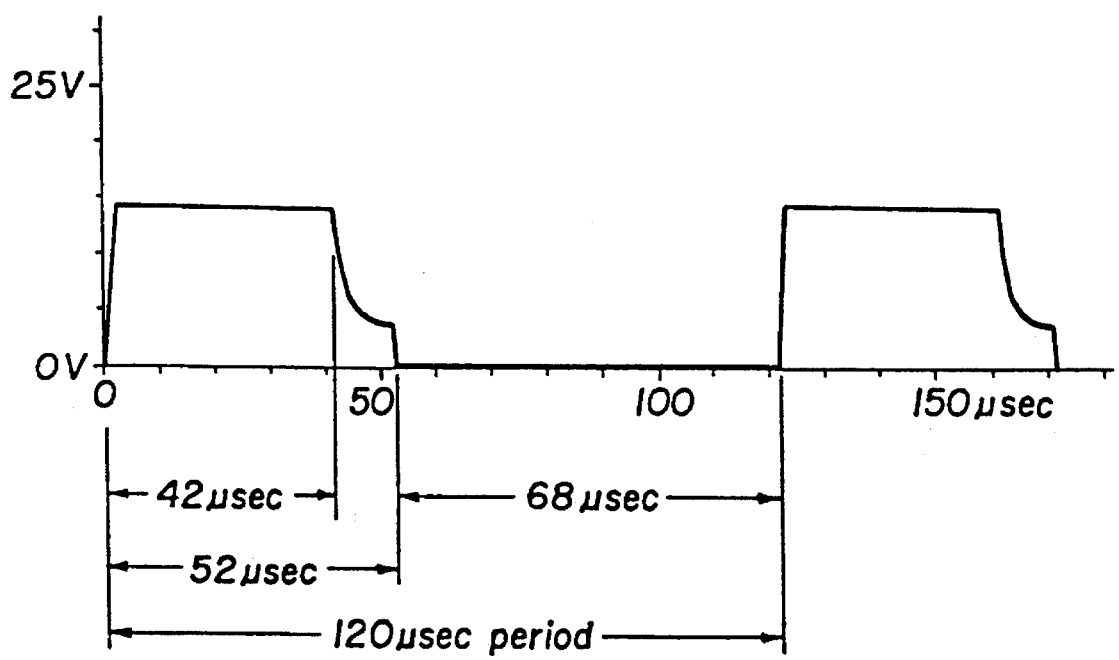
FIG. 3 illustrates the voltage output wave form of the schematic of FIG. 1.

The fly back voltage causes diode 34 to forward bias and transfer current produced by induction in the secondary of the transformer 19 to a battery which will be connected to terminals 36 and 38 of the circuit 10. The character of the current produced is in the form of high frequency pulses illustrated in FIG. 2. Wave forms representative of the current pulses in FIG. 2 were obtained across a 10 ohm resistor load. It will be observed that the current rise time is quite abrupt and then decays to 0 in approximately 42 µ seconds. The current pulse peaked at 60 milliamps and had a repetition rate of 8.333 kilo Hz. The character of the voltage pulses produced is illustrated in FIG. 3 where the voltage is shown to rise very sharply, when switching transistor 20 is turned off, to a value of approximately 14 volts. The value of the voltage pulse falls off very slowly until the value of the current reaches zero, whereupon the voltage will drop exponentially and finally reach zero in approximately 52 µ seconds.

The peak pulse current produced by circuit 10 is greater than the leakage discharge current in a automobile battery. The effect of this is that a small average charge current can be effective in reducing or eliminating sulfate buildup on the plates of the lead acid storage battery over an extended period of time. The battery will therefore retain its ability to provide starting current over a long time and can be quickly recharged by a high current charger. The gentle spalling off of sulfate deposits on the plates of the battery by use of the present invention will allow the recovery and subsequent recharging of even old, otherwise unusable batteries.

A visual indication that circuit 10 is operating is provided by a light emitting diode (LED) 40 connected in series with the positive terminal 36.

The various components of circuit 10 are protected against an inadvertent connection of the terminals 36 and 38 to battery terminals of opposite polarity. When such a misconnection occurs, a high surge of current would occur, passing through diode 34 and damaging components of rejuvenator 10. Resistor 42 is provided to protect components of rejuvenator 10 from high current surges that might result from an error in connecting the terminals 36 and 38 to battery posts of opposite polarity. Resistor 42 is connected in series with the diode 34 and the positive terminal 36. It is a positive temperature coefficient resistor whose resistance increases significantly at a fairly low temperature. This change in resistance occurs rapidly and causes the current to fall to a level or levels that can be tolerated by the various components of the circuit 10. The components nominally can tolerate a current of 1 ampere.

Protecting the LED 40 from high current surges are a plurality of series-connected diodes 44, in turn connected in parallel with the LED 40. These diodes offer a very low impedance to current flow. In the event of a misconnection of the terminals, most of the current will flow through the diodes 44 to the positive temperature coefficient resistor 42. Further protection is provided for the solar cell bank 12 by the inclusion of diode 46 to prevent current flow to the solar cells when the terminals 36 and 38 are connected backward to battery terminals.

The output of the rejuvenator 10 may be applied to battery terminals by way of a plug connected to output terminals 36 and 38, and inserted into a cigarette lighter located in a vehicle. In the alternative, the output of the rejuvenator 10 may be applied by way of an extension cord and clips to be connected directly to the battery terminals. It is this latter alternative connection that could give rise to an error in connecting the output of the rejuvenator to the battery to be treated.

Identification of some of the components utilized in a prototype of the present invention are as follows:

Transistor 20 is Texas Instruments T1P41A power Transistor.

Transistor 24 is Motorola 2N4403 PNP Transistor.

Diodes 34, 44, and 46 are Motorola 1N4001 silicon rectifiers.

Diode 26 is a Motorola 1N4148 switching diode.

Resistor 42 is a Phillips 2322-661-11211 Positive Temperature Coefficient Resistor.

The other power source 50, to be connected when the battery is in a darkened environment, is shown comprised of an a.c. to d.c. converter 52. The converter 52 can be connected to a local source of a.c., usually 115 volts, by way of plug 54 to produce at its output 56 a d.c. voltage. The d.c. voltage is accessed by the rejuvenator and trickle charger 10 by way of plug 58 connected in parallel with the solar cell bank 12 through conductors 60 and 62.

The converter 52 is available commercially and typically is of the type used to operate portable radios, hand held calculators and the like. In a prototype constructed of the present invention, the converter 52 had an output of 7.5 volts and 300 ma. In as much as the parameters of the rejuvenator and trickle charger 10 dictated a d.c. source of two (2) volts, resistor 64, laving a value of eighteen (18) ohms, was added in series with conductor 62 to drop the voltage to two (2) volts at 300 milliamps. As the parameters of the rejuvenator and trickle charger 10 are changed as by the aforementioned use of Mosfet elements, the voltage output of the source 50 can be changed.

Now that the invention has been described, alternatives will occur to those skilled in the art and it is intended to cover such modifications or alternatives by way of the appended claims. For example, the number of solar cells in bank 12 could be reduced to 1 through the use of Mosfet transistors which are operable at lower voltage levels; for example ½ volt.

What is claimed is:

1. A rejuvenator for lead acid batteries comprising:
   a first source of d.c. voltage,
   a capacitor connected across said source,
   a transformer having a primary coil and a secondary coil, said primary coil connected across said capacitor, and
   a switching circuit including a first transistor which connects and disconnects said primary coil to and from said capacitor to produce in said secondary coil fast rise time current pulses occurring at a rate of 8.333 KHz for application to a battery.

2. The rejuvenator of claim 1 including means for connecting said first source in parallel with an alternate second source of d.c. voltage to be connected and used in lieu of said first source.

3. The rejuvenator of claim 1 including a second transistor responsive to voltage across said capacitor for turning said first transistor on and off, both transistors being on and off at the same time.

4. The rejuvenator of claim 1 including output terminals and a solid state positive temperature coefficient resistor having a step function characteristic in series with one of said terminals to protect the rejuvenator from high current surges in the event said terminals are connected to battery terminals of opposite polarity.

5. The rejuvenator of claim 4 including a light emitting diode connected in series with said positive temperature coefficient resistor to visually signal operation of the rejuvenator.

6. The rejuvenator of claim 1 including at least four (4) solar cells connected in series.

7. The rejuvenator of claim 2 wherein said second source comprises an a.c. to d.c. converter.

8. A solar powered rejuvenator for lead acid batteries comprising:
   a bank of four (4) solar cells connected in series,
   an a.c. to d.c. convertor connected in parallel with said solar cells and to be connected to a source of a.c. as an alternative to said solar cells,
   a capacitor connected across said bank of solar cells
   a transformer having a primary coil and a secondary coil, said primary coil connected across said capacitor
   a switching circuit including a first transistor having a collector connected to said primary coil and an emitter connected to ground to connect and disconnect said primary coil to and from said capacitor to produce in said secondary coil fast rise time current pulses for application to a battery, a second transistor having an emitter connected to said capacitor and a collector connected to a base of said first transistor connected to sense voltage values of said capacitor to turn said first transistor on and off, both first and second transistors being turned on and off at substantially the same time,
   a pair of output terminals for connection to terminals of the battery,
   an LED connected in series with one of said terminals to visually signal the operability of said rejuvenator, and
   a positive temperature coefficient resistor having a step function characteristic connected in series with said one of said terminals and said LED to protect the rejuvenator in the event said output terminals are connected to of opposite polarities of the terminals of the battery.

9. The rejuvenator of claim 8 including a plurality of serially connected diodes connected in parallel with said LED to provide a low impedance path to protect said LED in the event said output terminals are connected to battery terminals of opposite polarity.

* * * * *